United States Patent
Sprague

(10) Patent No.: US 8,503,063 B2
(45) Date of Patent: *Aug. 6, 2013

(54) MULTICOLOR DISPLAY ARCHITECTURE USING ENHANCED DARK STATE

(75) Inventor: Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/644,888

(22) Filed: Dec. 22, 2009

(65) Prior Publication Data

US 2010/0165448 A1     Jul. 1, 2010

Related U.S. Application Data

(60) Provisional application No. 61/141,566, filed on Dec. 30, 2008.

(51) Int. Cl.
*G02B 26/00* (2006.01)

(52) U.S. Cl.
USPC ............................ 359/296; 345/107; 345/690

(58) Field of Classification Search
USPC ................... 359/290–296; 345/107–108, 690
See application file for complete search history.

(56) References Cited

U.S. PATENT DOCUMENTS

| | | | |
|---|---|---|---|
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,525,866 B1 * | 2/2003 | Lin et al. | 359/296 |
| 6,538,801 B2 | 3/2003 | Jacobson et al. | |
| 6,650,462 B2 | 11/2003 | Katase | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,829,078 B2 | 12/2004 | Liang et al. | |

(Continued)

FOREIGN PATENT DOCUMENTS

| | | |
|---|---|---|
| EP | 1 089 118 | 4/2001 |
| WO | WO 99/53373 | 10/1999 |

(Continued)

OTHER PUBLICATIONS

U.S. Appl. No. 13/038,255, filed Mar. 1, 2011, Sprague.

(Continued)

*Primary Examiner* — Thomas K Pham
*Assistant Examiner* — Vipin Patel
(74) *Attorney, Agent, or Firm* — Perkins Coie LLP

(57) ABSTRACT

The present invention is directed to a multicolor display comprising a plurality of microcups, wherein (a) the microcups are separated by partition walls; (b) each of the microcups is filled with a display fluid comprising white charged pigment particles dispersed in a solvent of a dark color, (c) the microcups are sandwiched between a first layer and a second layer wherein the first layer comprises a common electrode and the second layer comprises a plurality of pixel electrode, and (d) each of the microcups is capable of displaying the white color state, a dark color state and a medium color state.

17 Claims, 9 Drawing Sheets

U.S. PATENT DOCUMENTS

| | | | |
|---|---|---|---|
| 6,864,875 B2 | 3/2005 | Drzaic et al. | |
| 6,930,818 B1 | 8/2005 | Liang et al. | |
| 7,009,756 B2 | 3/2006 | Kishi et al. | |
| 7,038,655 B2 | 5/2006 | Herb et al. | |
| 7,038,670 B2 | 5/2006 | Liang et al. | |
| 7,046,228 B2 | 5/2006 | Liang et al. | |
| 7,050,218 B2 | 5/2006 | Kanbe | |
| 7,075,502 B1 | 7/2006 | Drzaic et al. | |
| 7,226,550 B2 | 6/2007 | Hou et al. | |
| 7,283,199 B2 | 10/2007 | Aichi et al. | |
| 7,365,732 B2 | 4/2008 | Matsuda et al. | |
| 7,411,719 B2 | 8/2008 | Paolini et al. | |
| 7,417,787 B2 | 8/2008 | Chopra et al. | |
| 7,545,557 B2 | 6/2009 | Iftime et al. | |
| 7,548,291 B2 | 6/2009 | Lee et al. | |
| 7,982,941 B2 | 7/2011 | Lin et al. | |
| 8,072,675 B2 | 12/2011 | Lin et al. | |
| 8,115,729 B2* | 2/2012 | Danner et al. | 345/107 |
| 8,159,636 B2* | 4/2012 | Sun et al. | 349/106 |
| 2002/0033792 A1 | 3/2002 | Inoue | |
| 2002/0171620 A1 | 11/2002 | Gordon et al. | |
| 2003/0002132 A1 | 1/2003 | Foucher et al. | |
| 2003/0095094 A1 | 5/2003 | Goden | |
| 2003/0107631 A1 | 6/2003 | Goto et al. | |
| 2003/0132908 A1 | 7/2003 | Herb et al. | |
| 2004/0032389 A1* | 2/2004 | Liang et al. | 345/107 |
| 2004/0051935 A1 | 3/2004 | Katase | |
| 2004/0113884 A1 | 6/2004 | Albert et al. | |
| 2004/0136048 A1 | 7/2004 | Arango et al. | |
| 2004/0190115 A1 | 9/2004 | Liang et al. | |
| 2004/0263947 A1 | 12/2004 | Drzaic et al. | |
| 2005/0151709 A1 | 7/2005 | Jacobson et al. | |
| 2005/0190431 A1 | 9/2005 | Matsuda | |
| 2006/0197738 A1* | 9/2006 | Kawai | 345/107 |
| 2007/0080928 A1 | 4/2007 | Ishii et al. | |
| 2007/0268556 A1 | 11/2007 | Chopra et al. | |
| 2008/0174531 A1 | 7/2008 | Ash | |
| 2009/0034054 A1 | 2/2009 | Ikegami et al. | |
| 2009/0213452 A1 | 8/2009 | Lin et al. | |
| 2009/0251763 A1 | 10/2009 | Sprague et al. | |
| 2009/0273827 A1 | 11/2009 | Lin et al. | |
| 2010/0053728 A1 | 3/2010 | Lin et al. | |
| 2010/0165005 A1* | 7/2010 | Sprague | 345/690 |
| 2011/0217639 A1 | 9/2011 | Sprague | |
| 2011/0261433 A1 | 10/2011 | Sprague et al. | |
| 2011/0292094 A1 | 12/2011 | Lin | |

FOREIGN PATENT DOCUMENTS

| | | |
|---|---|---|
| WO | WO 01/67171 | 9/2001 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/092,052, filed Apr. 21, 2011, Sprague et al.

Allen, K. (Oct. 2003). Electrophoretics Fulfilled. *Emerging Displays Review: Emerging Display Technologies, Monthly Report—Oct. 2003*, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

U.S. Appl. No. 13/300,178, filed Nov. 18, 2011, Sprague et al.

U.S. Appl. No. 13/360,378, filed Jan. 27, 2012, Zhang.

U.S. Appl. No. 13/370,186, filed Feb. 9, 2012, Wang et al.

U.S. Appl. No. 13/371,293, filed Feb. 10, 2012, Zhang et al.

Non-Final Office Action dated Mar. 16, 2012 for U.S. Appl. No. 12/644,861.

U.S. Appl. No. 13/225,184, filed Sep. 2, 2011, Wang et al.

Final Office Action dated Aug. 31, 2012 for U.S. Appl. No. 12/644,861.

\* cited by examiner

MULTICOLOR DISPLAY ARCHITECTURE USING ENHANCED DARK STATE

This application claims priority to U.S. Provisional Application No. 61/141,566, filed Dec. 30, 2008; the content of which is incorporated herein by reference in its entirety.

FIELD OF THE INVENTION

The present invention is directed to multicolor display architecture comprising enhanced dark state.

BACKGROUND OF THE INVENTION

In order to achieve a multicolor display, color filters are often used. The most common approach is to add color filters on top of black/white sub-pixels of a pixelated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third ($1/3$) of the desired white state, the white state is fairly dim. To compensate this, a fourth sub-pixel may be added which can display only the black and white state, so that the white level is doubled at the expense of the red, green or blue color level (where each sub-pixel is only one fourth [$1/4$] of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with that, the white light level is normally substantially less than half of that of a black and white display, rendering it an unacceptable choice for display devices, such as e-readers or displays that need well readable black-white brightness and contrast.

An alternative technique utilizing a dual switching mode is proposed in U.S. Pat. No. 7,046,228. In this patent, each pixel is formed of three sub-pixels, each one of which is a microcup filled with a display fluid of an appropriate color (i.e., red, green or blue) with charged white particles in the microcups and a dual switching mode is used. With the dual switching mode, an extra set of electrodes are added to each microcup so that the microcup can be switched into three states: white (with the particles on top), colored (with the particles on bottom), and black (with the particles moved to the sides). A black background layer is used so that when the particles are moved sideways, the black state is seen. The advantage of this is that high quality white and black states can be achieved while still offering red/green/blue colors. This dual mode design requires a special circuitry structure within each sub-pixel, which may reduce backplane yield and affect costs. In addition, a masking layer may be required to block light reflected by the white sub-pixels in the black state to maintain the desired contrast.

SUMMARY OF THE INVENTION

The present invention is directed to an alternative design of a multicolor display. One of the key features of the invention is the intense dark color of the display fluid filled in the microcups, which allows the dark state to appear black. The display device may achieve high quality black and white states with only one pixel electrode per microcup and only one drive circuit per pixel, thus leading to simpler fabrication and lower manufacturing costs. In practice, a standard active matrix array may be used to drive the display device.

One aspect of the invention is directed to a multi-color display device, which comprises a plurality of microcups wherein
 a) the microcups are separated by partition walls;
 b) each of the microcups is filled with a display fluid comprising white charged pigment particles dispersed in a solvent of a dark color;
 c) the microcups are sandwiched between a first layer and a second layer wherein the first layer comprises a common electrode and the second layer comprises a plurality of pixel electrodes; and
 d) each of the microcups is capable of displaying the white color state, a dark color state and a medium color state.

In this aspect of the invention—In one embodiment, the multi-color display device may further comprise an adhesive layer of a dark color or a color complementary to the color of the solvent. In another embodiment, the top surface of the partition walls is of a dark color or a color complementary to the color of the solvent. In a further embodiment, the partition walls may be of a black or dark color. In one embodiment, the reflectance of the medium color state achieved by driving the white charged pigment particles to an area between the common electrode and the pixel electrode in the microcup has at least five times, preferably at least ten times, the reflectance of the dark color state. In one embodiment, the dark color of the solvent is dark red, dark green or dark blue. In one embodiment, no more than 10%, preferably no more than 3%, of the light is reflected at the peak transmission of the dark color state. In one embodiment, the microcups and the pixel electrodes are aligned. In another embodiment, the microcups and the pixel electrodes are aligned only in one axis. In one embodiment, the particles are driven to the mid-level in the microcup. In another embodiment, the particles are distributed throughout the display fluid. In one embodiment, each microcup represents a sub-pixel and three sub-pixels form a pixel. In one embodiment, the device further comprises an active matrix driving system.

Another aspect of the invention is directed to a multi-color display device, which comprises a plurality of microcups wherein
 a) each of the microcups is filled with a display fluid comprising black and white charged particles carrying charges of opposite polarities and dispersed in a clear and colored solvent;
 b) the microcups are sandwiched between a first layer and a second layer wherein the first layer comprises a common electrode and the second layer comprises a plurality of pixel electrodes; and
 c) each of the microcups is capable of achieving a white state, a black state and a color state.

In this aspect of the invention—In one embodiment, the colored solvent is red, green or blue respectively. In one embodiment, the microcups and said pixel electrodes are aligned. In another embodiment, the microcups and said pixel electrodes are aligned only in one axis. In one embodiment, the color state achieved by driving both the white and black charged pigment particles to an area between the common electrode and the pixel electrode has a reflectance at least five times, preferably at least ten times, the reflectance of the black state. In one embodiment, the particles are driven to the mid-level in a microcup. In another embodiment, the particles are distributed in the display fluid. In one embodiment, each microcup represents a sub-pixel and three sub-pixels form a pixel. In one embodiment, the device further comprises an active matrix driving system.

BRIEF DISCUSSION OF THE DRAWINGS

FIGS. 6a-6c illustrate how different color states may be displayed with a two particle system.

DETAILED DESCRIPTION OF THE INVENTION

Figure 1:
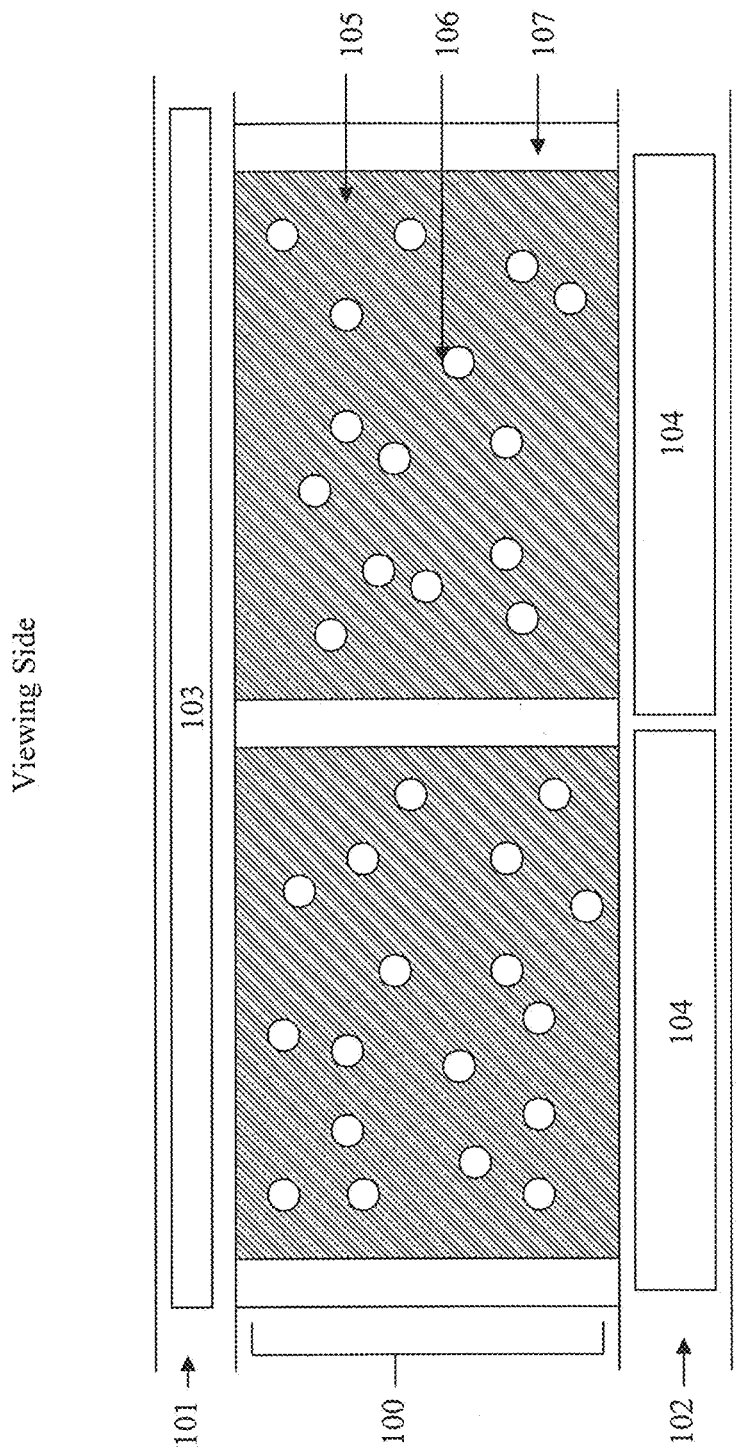
FIG. 1 depicts a cross-section view of a multicolor display device of the present invention.

FIG. 1 depicts a cross-section view of a color display device of the present invention. A microcup (100) is sandwiched between a first layer (101) and a second layer (102). The microcup (100) is surrounded by partition walls (107). The first layer comprises a common electrode (103). The second layer comprises multiple pixel electrodes (104).

The microcup (100) is a micro-container filled with a display fluid (105). Details of the term "microcup" are given in U.S. Pat. No. 6,930,818, the content of which is incorporated herein by reference in its entirety.

While microcups are specifically mentioned in the present application, it is understood that any micro-containers (e.g., microcapsules), regardless of their shapes or sizes, are within the scope of the present application, as long as the micro-containers are filled with a display fluid and have the same functions as the microcups.

In one embodiment of the invention, the display fluid (105) is an electrophoretic fluid comprising only one type of charged pigment particles (106), usually white, dispersed in a colored dielectric solvent or solvent mixture, as shown in FIG. 1. The pigment particles may be positively charged or negatively charged. The color of the electrophoretic fluid (or the color of the dielectric solvent or solvent mixture) may be a dark red, dark green, dark blue or another dark color. The display fluids in the microcups are of different colors and each of the microcups represents a sub-pixel.

The common electrode (103) is usually a transparent electrode layer (e.g., ITO), spreading over the entire top of the display device.

The second layer (102) comprises multiple pixel electrodes (104). The pixel electrodes (104) are described in U.S. Pat. No. 7,046,228, the content of which is incorporated herein by reference in its entirety. It is noted that while active matrix driving electrodes are mentioned as pixel electrodes, the scope of the present invention encompasses other types of electrode addressing such as passive matrix driving, as long as the electrodes serve the desired functions.

Figure 2A:
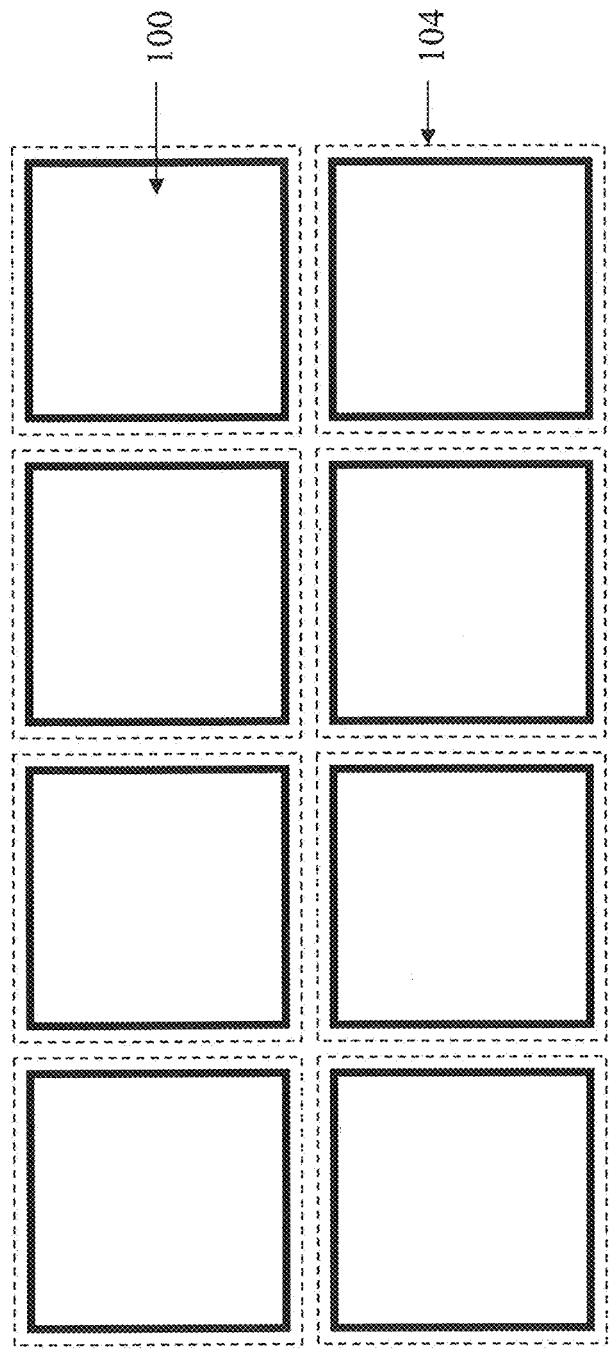
FIG. 2a depicts an aligned design.

The pixel electrodes and the microcups may be aligned. FIG. 2a shows an example. The microcups (solid lined, 100) and the pixel electrodes (104, dotted lined) are aligned. In such an aligned design, each pixel electrode corresponds to one microcup.

Figure 2B:
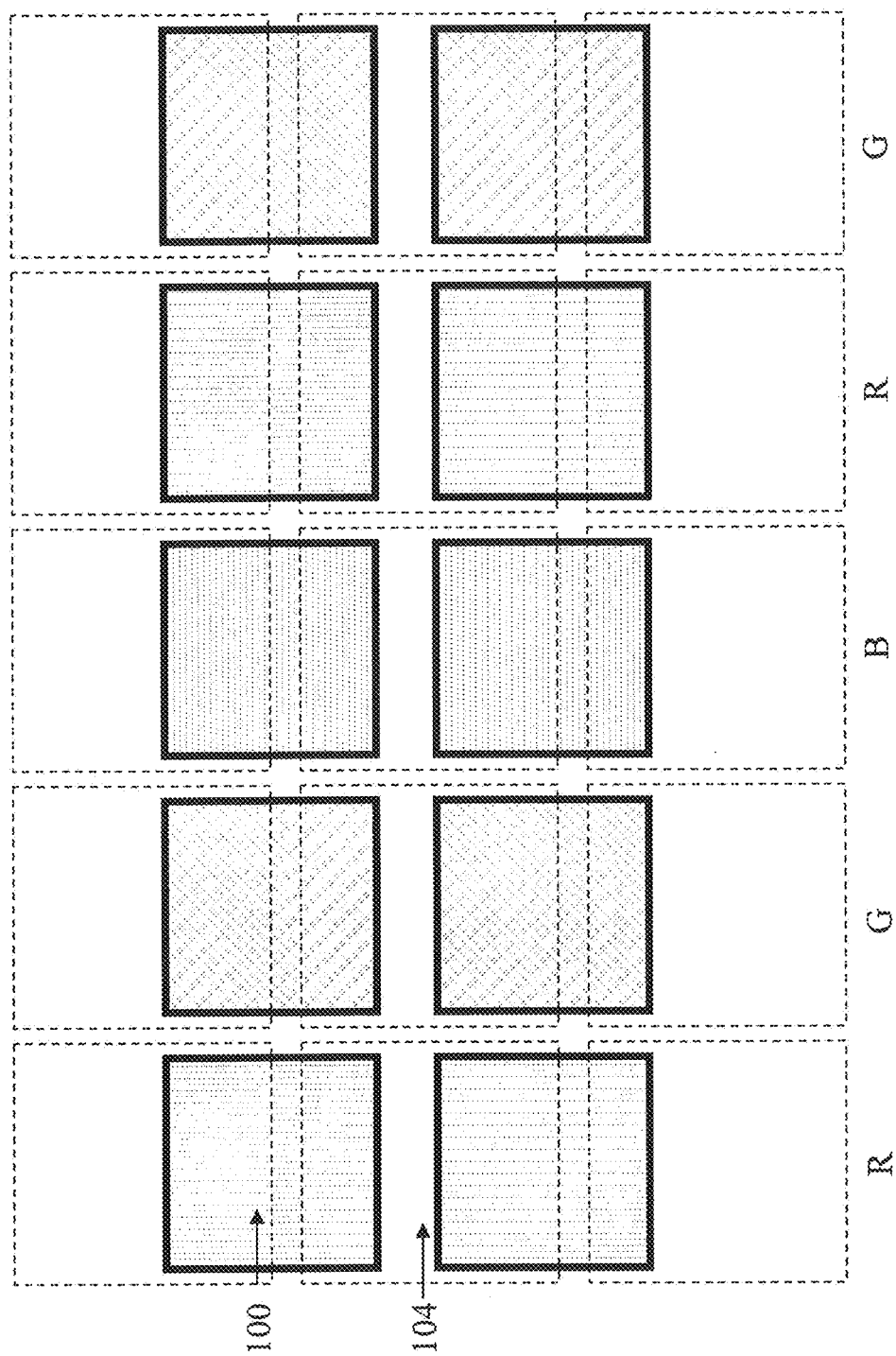
FIG. 2b depicts a design with alignment in only one axis.

FIG. 2b is a top view of a design which requires only alignment in one axis. In this figure, the microcups (solid lined, 100) and the pixel electrodes (dotted lined, 104) are un-aligned in one direction (i.e., the Y-axis) and each pixel electrode is underneath parts of two neighboring microcups. In the context of the present invention, the term "un-aligned" or "non-aligned" is intended to encompass configurations in which at least one pixel electrode is underneath parts of more than one microcup and the unaligned configuration is only in one direction. The non-alignment is in one axis to simplify the manufacture of the display device, and in this case, the colored pixels are in vertical stripes, as shown.

Figure 3:
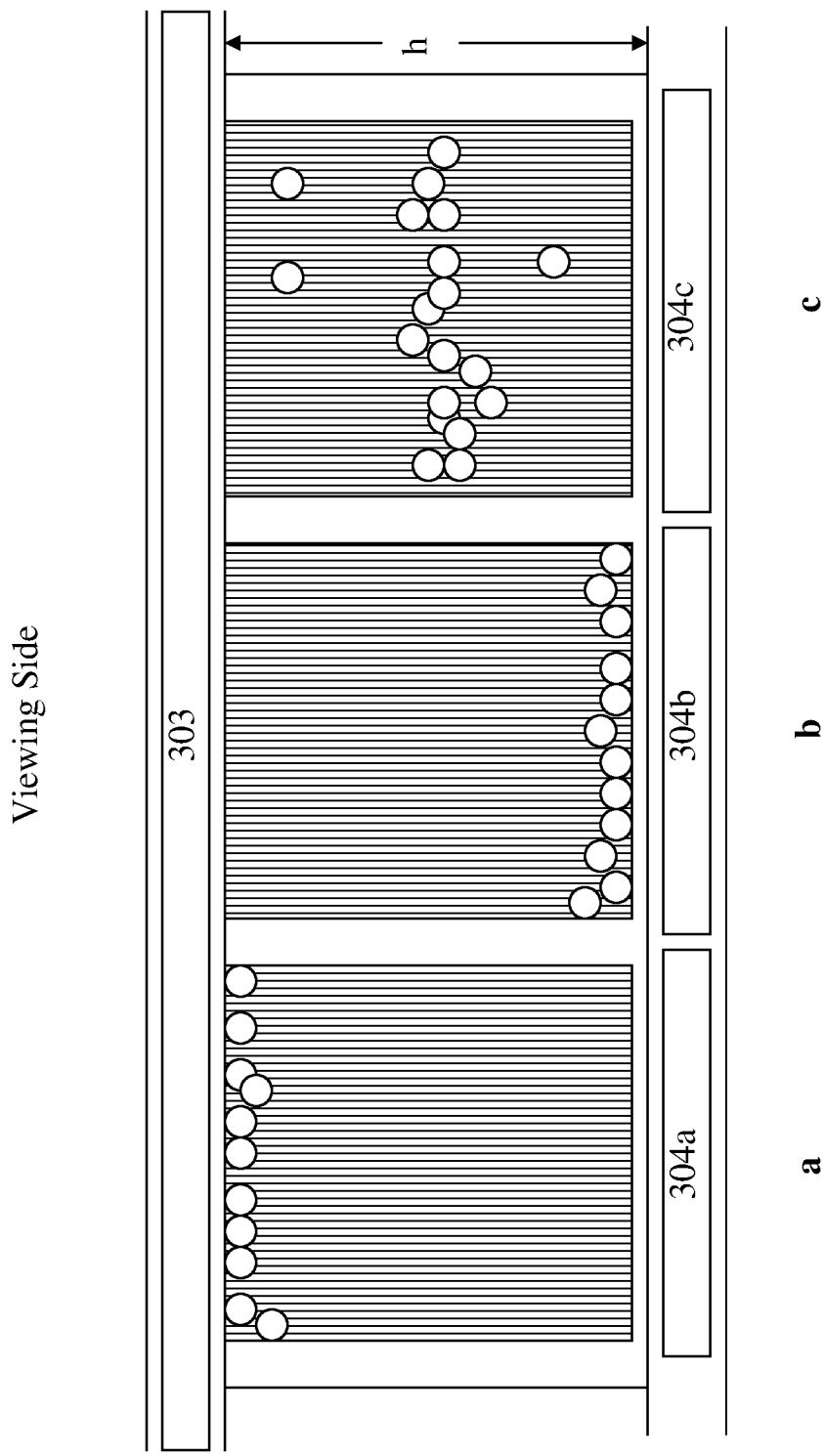
FIG. 3 illustrates how different color states may be displayed.

FIG. 3 (a-c) illustrates how black, white and color states may be displayed. In this example, the display fluid comprises charged white pigment particles dispersed in a dark red fluid.

In FIG. 3a, by applying appropriate voltages to the common (303) and pixel (304a) electrodes, the white particles move to be near or at the common electrode (303). As a result, the white color is seen at the viewing side.

In FIG. 3b, by applying appropriate voltages to the common (303) and pixel (304b) electrodes, the white particles move to be near or at the pixel electrode (304b). Because the dark red dye absorption is strong, the color seen in this case is a very dark red color. At a high enough level of the color density, such a microcup will appear black to the viewers.

The color of the fluid is dark enough that when the white particles are at or near the pixel electrode (i.e., at the bottom of the microcup), preferably not more than 10%, more preferably not more than 3%, of the light is reflected at the peak transmission of the dark color state.

By properly adjusting the timing (i.e., duration) of a driving waveform, a substantial amount of the white particles may move to be in an area between the common electrode and the pixel electrode (i.e., about the mid-level in the microcup), as shown in FIG. 3c. In this scenario, the reflected color appears to be a medium red color.

The degree of darkness of the display fluid preferably is such that the reflectance of the medium color state (as shown, for example, in FIG. 3c) is at least 5 times, more preferably at least 10 times, the reflectance of the dark color state (as shown, for example in FIG. 3b).

In the context of the present invention, when the particles are driven to an area between the common electrode and the pixel electrode, the particles may be distributed throughout the display fluid or a substantial amount of the particles may gather at the mid-level in a microcup. A "substantial amount," as used herein, refers to at least 60%, preferably 75%, more preferably 90%, of the particles. "The mid-level," as used herein, refers to the area between 20 and 80%, preferably 30 and 70%, more preferably 40 and 60% of the height (h) of a microcup. In any case, the reflectance of the medium color achieved by driving the particles to an area between the common and pixel electrodes is at least 5 times, more preferably at least 10 times, the reflectance of the dark color state achieved by driving the particles to be at or near the pixel electrode.

Figure 4:
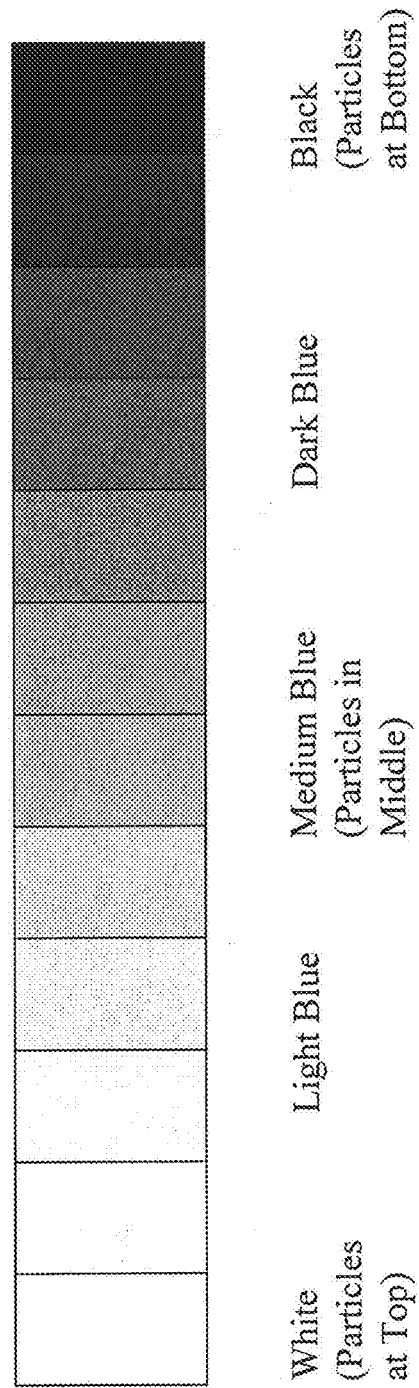
FIG. 4 shows a scale of colors which may be displayed by the color display of the present invention.

FIG. 4 shows a scale of colors which may be displayed by the color display of the present invention. The black state at the right end of the scale is achieved when the white particles are at or near the bottom of a microcup. The white state at the left of the scale is achieved when the white particles are at or near the top of a microcup. The blue color state in the middle of the scale is achieved when the white particles are distributed in the mid-level of a microcup.

FIG. 5 illustrates how multiple colors are displayed with a display device of the present invention. Each microcup represents a sub-pixel and each pixel has three sub-pixels. The three microcups, each representing a sub-pixel, are filled with display fluids of red, green and blue color, respectively.

Figure 5C:
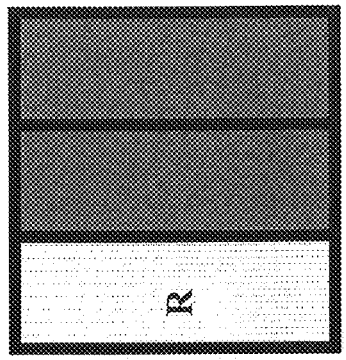
FIGS. 5a-5e shows how multiple color states may be displayed.
Figure 5B:
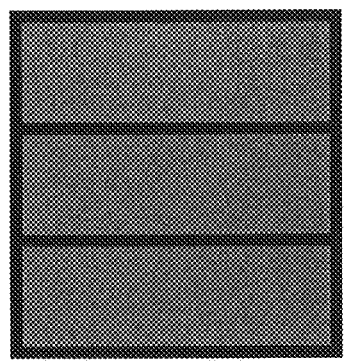
Figure 5A:
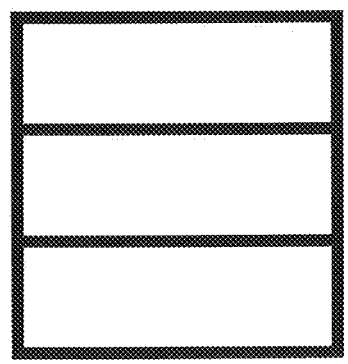
Figure 5E:
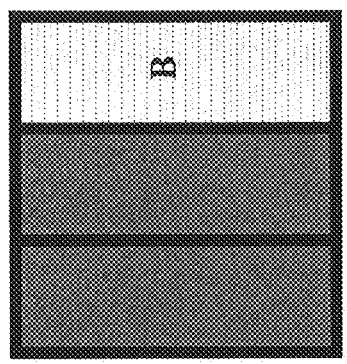
Figure 5D:
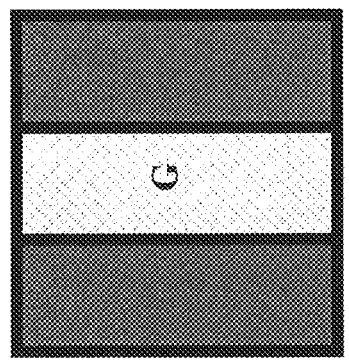

In FIG. 5a, when a white pixel is desired, all three sub-pixels are turned to the white color state. In FIG. 5b, when a black pixel is desired, all three sub-pixels are turned to the dark color state. FIG. 5c, when a red color is desired, one of the sub-pixel is turned to red (pigment particles are driven to the middle level of the display fluid, as shown in FIG. 3c) and the remaining two sub-pixels are turned to the black state for maximum color saturation. Similarly, FIG. 5d and FIG. 5e display the green and blue colors respectively. Alternatively, in FIGS. 5c, 5d and 5e, one of the sub-pixel is driven to the color state while the remaining two sub-pixels are driven to the white state for maximum brightness (at the expense of the color saturation). Further alternatively, in FIGS. 5c, 5d and 5e, one of the sub-pixel is driven to the color state while the remaining two sub-pixels are driven to the black and white states respectively.

Figure 6A:
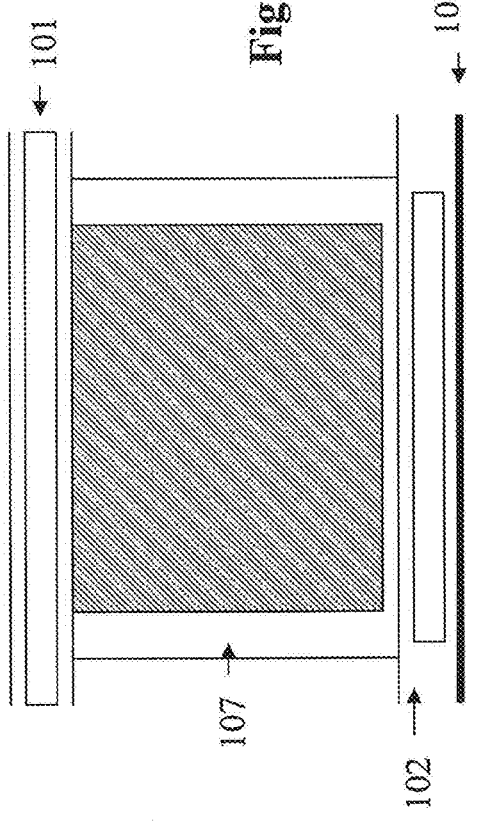
FIGS. 6a-6c show alternative designs of the present invention.
Figure 6B:
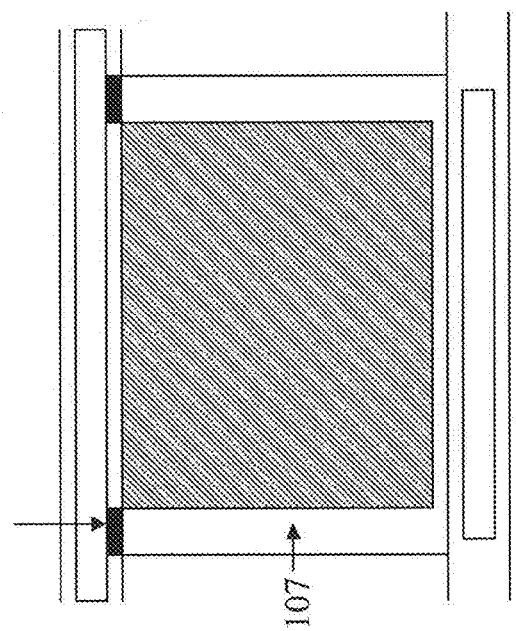
Figure 6C:
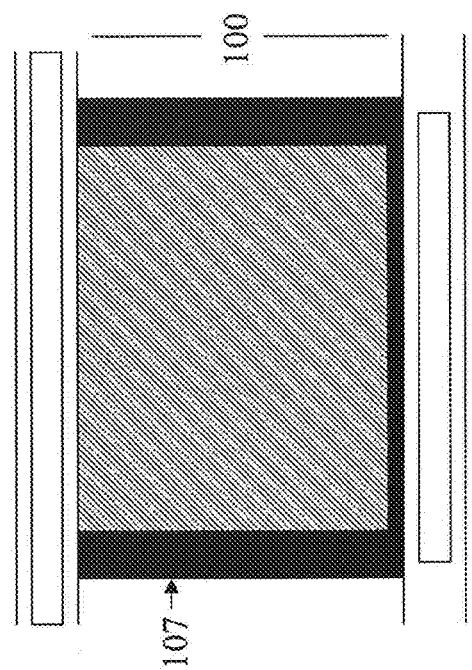

FIGS. 6a-6c show alternative designs of the present invention.

In FIG. 6a, there is a dark color (e.g., black) adhesive layer (108) at the opposite side of the viewing side. The first layer (101), the second layer (102) and the partition walls (107) are all transparent. The purpose of the colored adhesive layer is to add intensity to the dark color state. The adhesive layer may be of the black color or a dark color complementary to the color of the display fluid. In the latter case, if the microcups are filled with a display fluid of a dark red color, the dark color state will have a tinge of red and in this case, the adhesive layer may be of a combined color of dark green and dark blue. The dark green and dark blue colors from the adhesive layer through the partition walls and the red color from the display fluid together will provide a neutral black color.

Likewise, if the microcups are filled with a display fluid of a dark green color, the adhesive layer then may be of a combined color of dark red and dark blue (complementary color). If the microcups are filled with a display fluid of a dark blue color, the adhesive layer then may be of a combined color of dark red and dark green (complementary color). As shown, the adhesive layer has the function of enhancing the contrast and neutralizing the dark color state displayed by the display device. Suitable pigments or dyes are added to the adhesive layer to achieve the desired color of the adhesive layer.

When a dark adhesive layer is present as shown in FIG. 6a, in the white state (as shown in FIG. 3a) or the medium color state (as shown in FIG. 3c), the much brighter color displayed would overwhelm the small amount of the dark color in the wall area, thus not being affected by the dark adhesive layer.

The dark color seen through the partition walls may also be achieved by other alternative designs. In one embodiment, the top surface (107b) of the partition walls (107) may be colored black or a dark color state, as shown in FIG. 6b. The black or a dark color may be applied to the top surface of the partition walls by methods as described in U.S. Pat. No. 6,829,078, the content of which is incorporated herein by reference in its entirety. The top surface of the partition walls may be of a dark color complementary to the dark color of the display fluid within the microcups. In other words, the top surface may be of a combined color of dark red and dark green, or a combined color of dark green and dark blue or a combined color of dark blue and dark green, depending on the color of the display fluid. Suitable pigments or dyes may be used to achieve the desired color of the top surface layer (107b).

In another embodiment, the entire partition walls (107) may be of a black or dark color. This may be achieved by forming the microcup structure (100) in a black or dark color, as shown in FIG. 6c. In this option, suitable pigments or dyes may be added to the composition for forming the microcup structure.

In another embodiment of the invention, the display fluid may comprise two types of charged pigment particles of contrast color, usually white and black, dispersed in a clear and colored solvent. The two types of the charged pigment particles carry charges of opposite polarities. For example, while the white particles are positively charged, the black particles are negatively charged, or vice versa. In this case, the color of the solvent does not have to be as dark as the color of the solvent in the one particle system.

Figure 7:
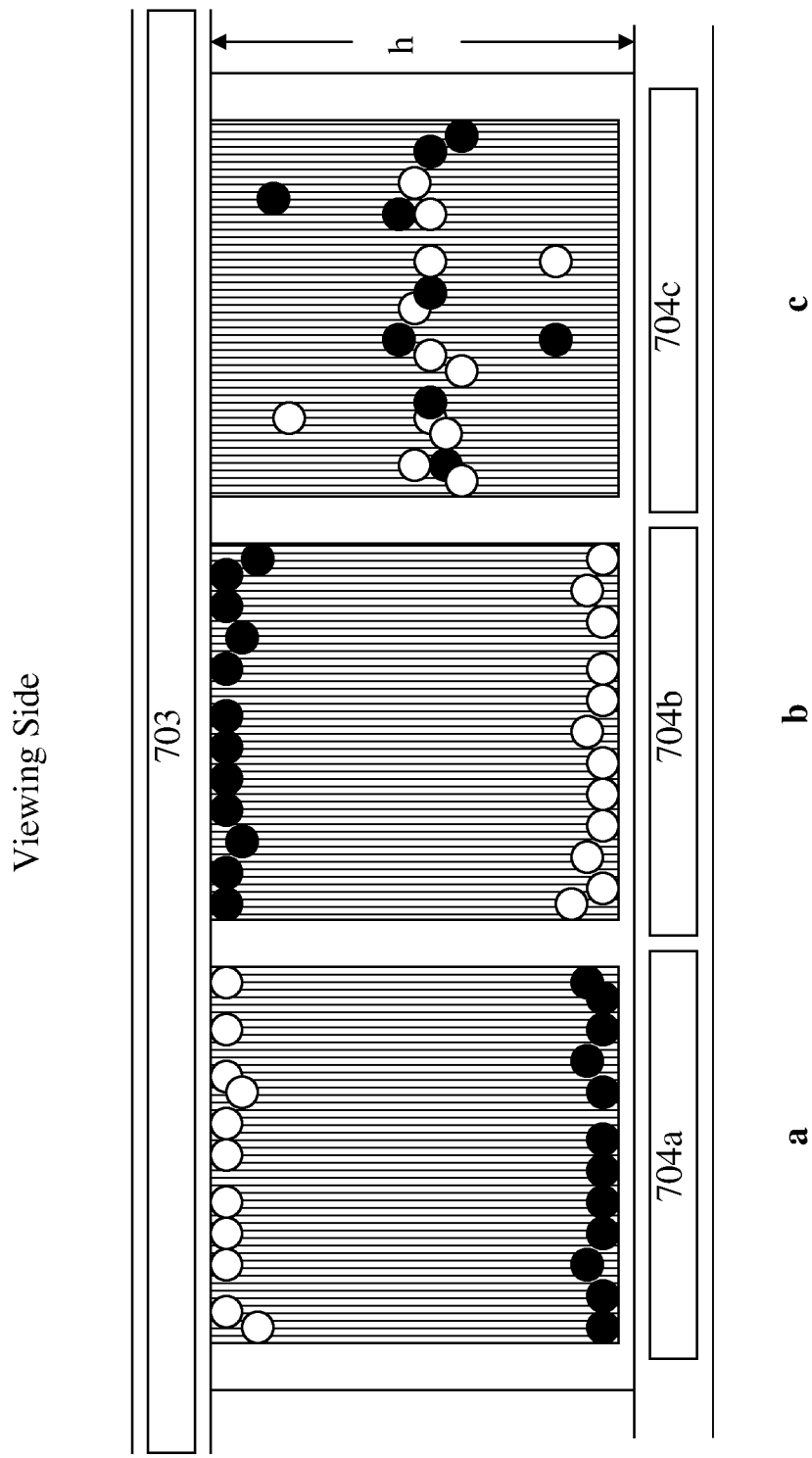
FIG. 7 shows another embodiment of this invention using a two particles system.

FIG. 7 (a-c) illustrates how black, white and color states may be displayed with this two particle system. In this example, the pigment particles are black and white and carry charges of opposite polarities. The solvent is, for example, of a red color.

In FIG. 7a, the white particles are driven to be near or at the common electrode (703) and the black particles are driven to be near or at the pixel electrode (704a). As a result, the white color is seen at the viewing side.

In FIG. 7b, the black particles are driven to be near or at the common electrode (703) and the white particles are driven to be near or at the pixel electrode (704b). As a result, the black color is seen at the viewing side.

In FIG. 7c, a substantial amount of the black and white particles are driven to be in an area between the common electrode and the pixel electrode (e.g., near or at the middle level of a microcup). As a result, the red color of the solvent is seen at the viewing side.

In the two particle system as described in FIGS. 7a-7c, the reflectance of the color state (as shown, for example, in FIG. 7c) is at least 5 times, more preferably at least 10 times, the reflectance of the black state (as shown, for example in FIG. 7b).

In the two particle system, each pixel has three-sub-pixels, and the multiple color states are displayed as illustrated in FIGS. 5a-5e.

The non-aligned design can be used in both the one particle and two particle systems.

It is also noted that the display device of the present invention, may be viewed from either the side of the common electrode or the side of the pixel electrode. It is preferred that the display device is viewed from the side of the common electrode. This is applicable to both the one particle system and the two particle system. The dark colored adhesive layer, if present, is always on the non-viewing side of the display device.

The display device of the present invention may be manufactured by methods known in the art. For example, the microcup layer may be formed on a layer of pixel electrodes followed by laminating a common electrode layer over the microcup layer, as described in U.S. Pat. No. 6,930,818. For the non-microcup type display devices, they may also be manufactured by methods known in the art.

Example

This example compares the multiple color states displayed by the present invention against the multicolor states displayed utilizing color filters.

Figure 8A:
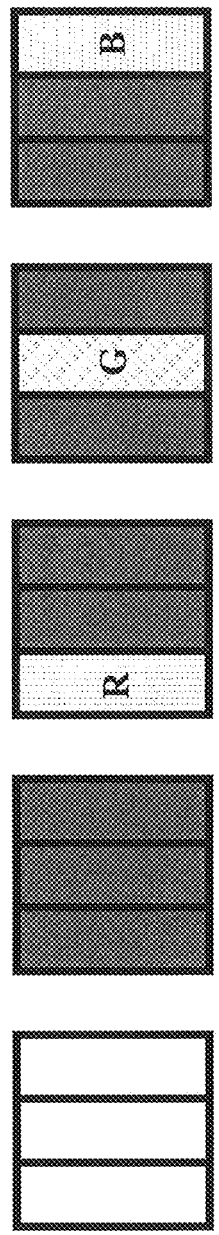
FIGS. 8a and 8b show comparison of the display of the present invention against a prior art design utilizing color filters.

FIG. 8a shows the five color states (white, red, green, blue and black) displayed by the present invention. Each pixel has three sub-pixels. The sub-pixels are microcups filled with display fluids comprising white pigment particles dispersed in a red, green and blue solvent, respectively. The five color states are achieved as described above. In the one particle system, the solvents are of dark colors.

Figure 8B:
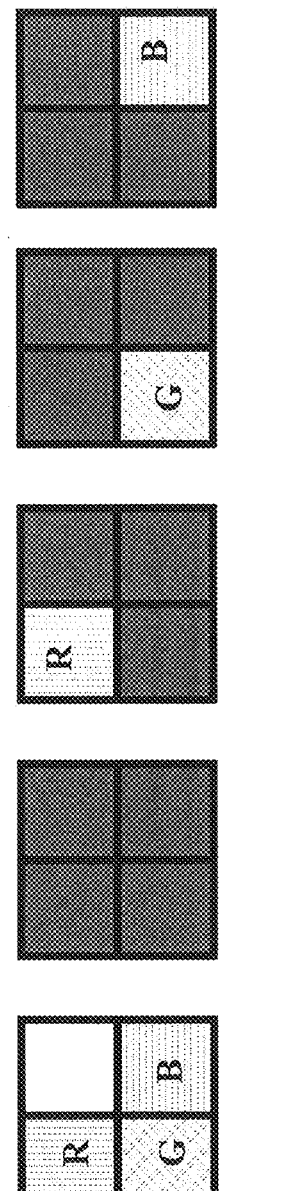

FIG. 8b shows the five color states displayed utilizing the color filters. Each pixel, in this case, has four sub-pixels. One of the sub-pixels is capable of displaying only black/white color states. The other three sub-pixels have color filters of red, green and blue placed on top to display the red, green and blue colors, respectively.

The following table summarizes the results:

| Test Data | The Present Invention (FIG. 8a) | The Color Filters (FIG. 8b) |
| --- | --- | --- |
| Contrast Ratio | 10:1 | 4:1 |
| Whiteness | 30% | 15% |
| Color States | Good (⅓ Fill Factor) | Lower Brightness (¼ Fill Factor) |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A multi-color display device comprising a plurality of microcups, wherein
a) said microcups are separated by partition walls,
b) each of said microcups is filled with a display fluid comprising white charged pigment particles dispersed in a solvent of a color selected from the group consisting of dark red, dark green, and dark blue wherein the dark red, dark green and dark blue appear black at a high level of color density, and the solvent is not of the same color in all the microcups,
c) said microcups are sandwiched between a first layer and a second layer wherein said first layer comprises a common electrode and said second layer comprises a plurality of pixel electrodes, and
d) each area corresponding to a pixel electrode displays a white color state by driving the white charged pigment particles to be near or at the common electrode, displays a dark color state which appears black by driving the white charged pigment particles to be near or at the pixel electrode, and displays a medium color of the solvent by driving the white charged pigment particles to an area between the common electrode and the pixel electrode, wherein the medium color of the solvent has a reflectance at least five times the reflectance of the dark color state.

2. The multi-color display device of claim 1, further comprising an adhesive layer of a dark color or a color complementary to the color of the solvent.

3. The multi-color display device of claim 1, wherein the top surface of the partition walls is of a dark color or a color complementary to the color of the solvent.

4. The multi-color display device of claim 1, wherein said partition walls are of a black or dark color.

5. The multi-color display device of claim 1, wherein the medium color of the solvent has a reflectance at least ten times the reflectance of the dark color state.

6. The multi-color display device of claim 1, wherein no more than 10% of the light is reflected at the peak transmission of the dark color state.

7. The multi-color display device of claim 6, wherein no more than 3% of the light is reflected at the peak transmission of the dark color state.

8. The multi-color display device of claim 1, wherein said microcups and said pixel electrodes are aligned.

9. The multi-color display device of claim 1, wherein said microcups and said pixel electrodes are aligned only in one axis.

10. The multi-color display device of claim 1, wherein each microcup represents a sub-pixel and three sub-pixels form a pixel.

11. The multi-color display device of claim 1, wherein the pixel electrodes are active matrix driving electrodes.

12. A multi-color display device comprising a plurality of microcups, wherein
a) each of said microcups is filled with a display fluid comprising charged black particles and oppositely charged white particles, both of which are dispersed in a solvent of a color selected from the group consisting of red, green and blue, and the color of the solvent is not the same in all the microcups;
b) said microcups are sandwiched between a first layer and a second layer wherein said first layer comprises a common electrode and said second layer comprises a plurality of pixel electrodes; and
c) each area corresponding to a pixel electrode displays a white state by driving the white charged pigment particles to be near or at the common electrode, displays a black state by driving the black charged pigment particles to be near or at the common electrode, and displays a color state by driving the black and white charged pigment particles to an area between the common electrode and the pixel electrode wherein the color state has a reflectance at least five times the reflectance of the black state.

13. The multi-color display device of claim 12, wherein said microcups and said pixel electrodes are aligned.

14. The multi-color display device of claim 12, wherein said microcups and said pixel electrodes are aligned only in one axis.

15. The multi-color display device of claim 12, wherein the color state has a reflectance at least ten times the reflectance of the black state.

16. The multi-color display device of claim 12, wherein each microcup represents a sub-pixel and three sub-pixels form a pixel.

17. The multi-color display device of claim 12, wherein the pixel electrodes are active matrix driving electrodes.

* * * * *